United States Patent
Wilson, Jr. et al.

(10) Patent No.: US 7,665,293 B2
(45) Date of Patent: Feb. 23, 2010

(54) LOW SPEED ROTOR SHAFT FOR A SMALL TWIN SPOOL GAS TURBINE ENGINE

(75) Inventors: Jack W. Wilson, Jr., Palm Beach Gardens, FL (US); Robert E. deLaneuville, North Palm Beach, FL (US); Paul E. Orndoff, Palm Beach Gardens, FL (US); Ryan C. McMahon, North Palm Beach, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 70 days.

(21) Appl. No.: 11/975,671

(22) Filed: Oct. 19, 2007

(65) Prior Publication Data

US 2009/0031732 A1    Feb. 5, 2009

Related U.S. Application Data

(60) Provisional application No. 60/963,084, filed on Aug. 2, 2007.

(51) Int. Cl.
*F02C 7/00* (2006.01)
*F02K 3/04* (2006.01)

(52) U.S. Cl. ............... 60/226.1; 60/792; 415/122.1
(58) Field of Classification Search ............ 60/226.1, 60/791, 792; 415/122.1
See application file for complete search history.

(56) References Cited

U.S. PATENT DOCUMENTS

| | | | |
|---|---|---|---|
| 3,814,549 A | 6/1974 | Cronstedt | |
| 3,886,737 A * | 6/1975 | Grieb | 60/226.1 |
| 4,392,839 A | 7/1983 | Aucktor | |
| 4,557,704 A * | 12/1985 | Ito et al. | 464/181 |
| 4,711,008 A | 12/1987 | Nakamura | |
| 5,277,661 A | 1/1994 | Mak et al. | |
| 5,454,222 A | 10/1995 | Dev | |
| 5,526,640 A | 6/1996 | Brooks et al. | |
| 5,951,794 A | 9/1999 | Dickson, Jr. | |
| 6,062,116 A * | 5/2000 | Morioka et al. | 82/1.11 |
| 6,117,018 A | 9/2000 | Tanada | |

(Continued)

*Primary Examiner*—Louis J Casaregola
(74) *Attorney, Agent, or Firm*—John Ryznic

(57) ABSTRACT

An inner rotor shaft for use in a small twin spool gas turbine engine, the inner rotor shaft having a hollow middle section formed of a smaller diameter hollow section on a compressor end and a larger diameter hollow section on the turbine end of the shaft. Solid shaft end extend from the hollow section to form a forward solid shaft end to secure the fan rotor disk and an aft solid shaft end to secure the turbine rotor disk. A parabolic shaped transition section joins the forward shaft end to the smaller diameter hollow section, and a conical shaped transition section joins the aft shaft end to the larger diameter hollow section. A conical shaped transition piece joins the two hollow sections together to form an inner rotor shaft that can fit within a minimal space between the compressor rotor disk and the annular combustor assembly of the engine. The conical shaped transition section on the turbine end is so shaped in order to fit within a space formed inside the high pressure turbine rotor disk of the engine in order to minimize the axial spacing between the bearings that support the inner rotor shaft and raise the critical speed of the shaft to a safe level above the operating speed of the engine in order to make such a small twin spool gas turbine engine possible.

15 Claims, 4 Drawing Sheets

U.S. PATENT DOCUMENTS

| | | |
|---|---|---|
| 6,234,912 B1 | 5/2001 | Koschier et al. |
| 6,247,346 B1 | 6/2001 | Dickson, Jr. |
| 6,287,209 B1 | 9/2001 | Nakajima et al. |
| 6,328,656 B1 | 12/2001 | Uchikawa et al. |
| 6,364,779 B1 | 4/2002 | Duddy |
| 6,409,606 B1 | 6/2002 | Nakajima et al. |
| 6,422,948 B1 | 7/2002 | Murakami |
| 6,554,714 B2 | 4/2003 | Kurecka et al. |
| 6,726,571 B2 | 4/2004 | Ferriman et al. |
| 6,749,518 B2 | 6/2004 | Carrier et al. |
| 7,112,141 B2 | 9/2006 | Sakurai et al. |

\* cited by examiner

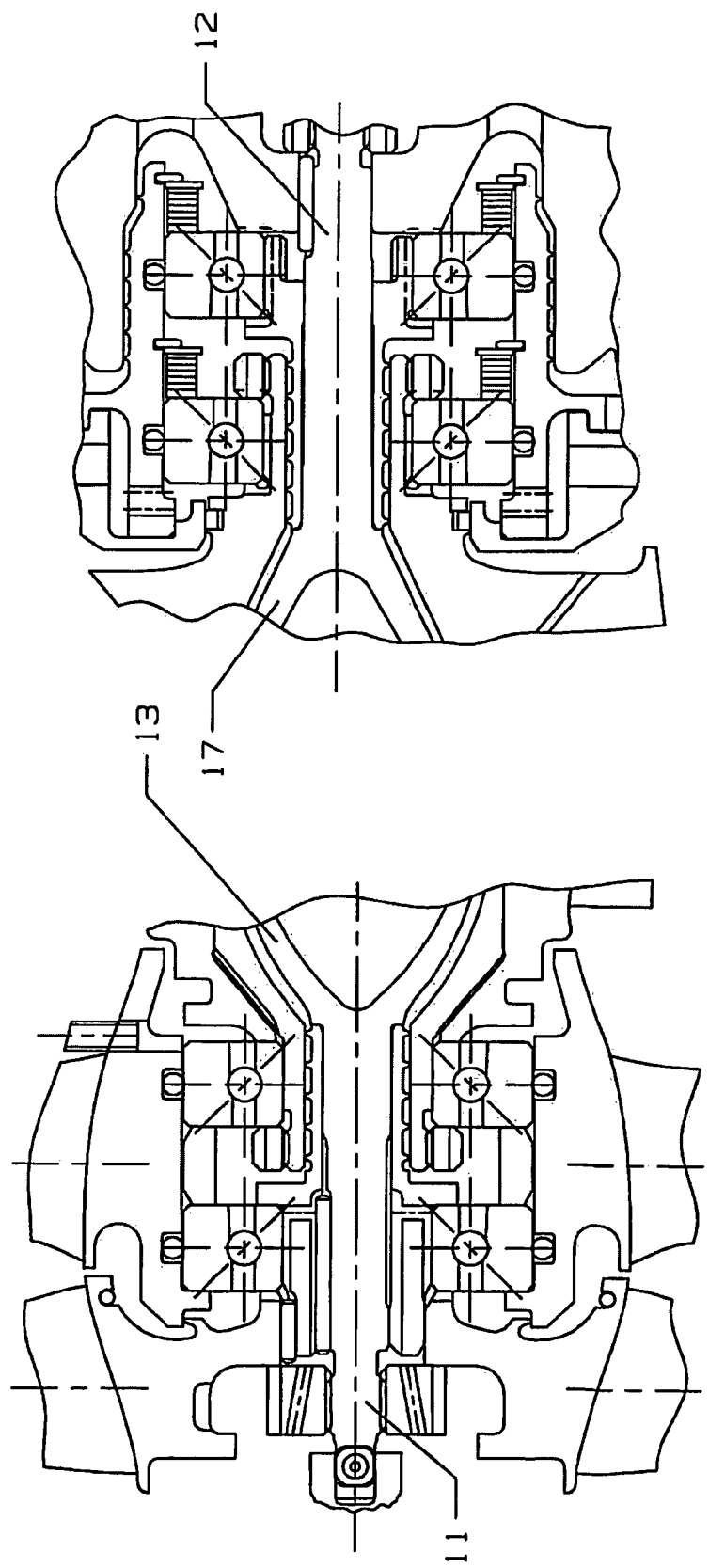

LOW SPEED ROTOR SHAFT FOR A SMALL TWIN SPOOL GAS TURBINE ENGINE

CROSS-REFERENCE TO RELATED APPLICATIONS

This application is claims the benefit to an earlier filed U.S. Provisional application 60/963,084 filed on Aug. 2, 2007 and entitled SMALL TWIN SPOOL GAS TURBINE ENGINE the entire disclosure of which is herein incorporated by reference.

This application is also related to Regular U.S. application Ser. No. 11/903,553 filed on Sep. 21, 2007 and entitled HIGH SPEED ROTOR SHAFT FOR A SMALL TWIN SPOOL GAS TURBINE ENGINE; and related to Regular U.S. application Ser. No. 11/903,555 filed on Sep. 21, 2007 and entitled HIGH SPEED ROTOR SHAFT AND TURBINE ROTOR DISK ASSEMBLY; and related to Regular U.S. application Ser. No. 11/903,554 filed on Sep. 21, 2007 and entitled HIGH SPEED ROTOR SHAFT AND COMPRESSOR ROTOR DISK ASSEMBLY; and related to Regular U.S. application Ser. No. 11/903,556 filed on Sep. 21, 2007 and entitled TWIN SPOOL ROTOR ASSEMBLY FOR A SMALL GAS TURBINE ENGINE, all of which are incorporated herein by reference.

GOVERNMENT LICENSE RIGHTS

This invention was made with Government support under Contract No. W31P4Q-05-C-R003 awarded by the US Army. The Government has certain rights in the invention.

BACKGROUND OF THE INVENTION

1. Field of the Invention

The present invention relates generally to a small twin spool gas turbine engine, and more specifically to a hollow rotor shaft.

2. Description of the Related Art Including Information Disclosed Under 37 CFR 1.97 and 1.98

A gas turbine engine is a very efficient power plant and is used to power an aircraft such as a commercial or military aircraft or an unmanned aero vehicle (UAV). The PW4000 series engine made by Pratt & Whitney Aircraft Group is a large commercial turbofan engine with a dual-shaft (twin spool) and high bypass front fan. This engine produces 60,000 pounds of thrust and weighs 9,200 pounds dry. It is a very efficient engine. A twin spool engine has about two times the efficiency of a single spool engine and therefore the twin spool engine is used when efficiency is an important factor.

Recent developments in small unmanned aircraft, such as a UAV, have led to the use of small gas turbine engines to power these small aircraft. The more efficient the engine is in the UAV, the longer will be the loiter time. Small single spool gas turbine engines have been around for years to power small radio controlled planes or even a UAV such as a cruise missile or a video surveillance aircraft. With the demand for longer loiter times, a more fuel efficient gas turbine engine is desirable.

It has been common in the art of gas turbine engine design to scale down larger engines to the size needed. A small UAV only requires a few hundred pounds of thrust to power the aircraft. One major problem in the design of small gas turbine engines is scaling the larger engine down to the smaller size. As the size of the engine decreases, the rotational speed of the rotor shaft must increase in order to retain the high overall efficiency for a gas turbine engine. As the rotor shaft speed increases, the rotor dynamics becomes a major problem. A large gas turbine engine such as the PW4000 series engine cannot be scaled down below a certain size before the rotor dynamics and natural frequency problems start to cause problems. The low speed rotor shaft in the PW4000 series engine can be scaled down only so far before the bending mode (third mode) of the rotor shaft coincides with the natural frequency of the shaft. This is referred to in rotor dynamics as the critical speed. At the critical speed, a rotary shaft would break apart from the high bending stresses developed at the critical speed. The bending displacement would be infinite without adequate damping of the bearings. Engineers attempt to design the rotor shaft to operate below the critical speed so that these rotor dynamic problems do not occur.

In a twin spool gas turbine engine, a low pressure fan or compressor and a low pressure turbine are rotatably attached to the inner or low speed rotor shaft. A high pressure compressor and high pressure turbine are rotatably attached to the outer or high speed rotor shaft. Each shaft is rotatably supported by bearings on the shaft ends. The natural frequency of a rotating shaft is directly proportional to a ratio of the stiffness to the mass of the shaft. Thus, the natural frequency of the rotating shaft can be increased by either increasing the stiffness of the shaft, decreasing the mass of the shaft, or both.

Also, in the rotating shaft supported by bearings on both ends, as the length of the rotating shaft between bearings increases, the natural frequency decreases. If the shaft is lengthened, the natural frequency will be lowered. Thus, to produce a small gas turbine engine useful for a UAV or other small aircraft with a thrust of less than around 300 pounds, and to provide for a twin spool gas turbine engine in order to significantly improve the fuel efficiency of the engine, a new design is required for the inner or low pressure rotor shaft to make such an engine operational. The inner or low speed rotor shaft in a twin spool gas turbine engine requires a new design since the prior art twin spool engines cannot be scaled down to this level without the rotor dynamics problems occurring that limit the size of the shaft.

U.S. Pat. No. 5,454,222 issued to Dev on Oct. 3, 1995 and entitled SMALL GAS TURBINE ENGINE HAVING ENHANCED FUEL ECONOMY discloses a gas turbine engine having twin spools that has a smaller size and lesser weight than current turbine engines having the same power (at the time of the Dev invention) with a core engine having a diameter of about 0.35 meters (about 14 inches) that operates at about 54,000 rpm. As can be seen from the figures in the Dev patent, the inner or low speed rotor shaft is a straight solid shaft while the outer or high speed rotor shaft is solid but somewhat curved to conform to the radial compressor and turbine on the shaft. The twin spool engine of the Dev patent would be typical of the prior art twin spool gas turbine engines in that these engines cannot be scaled down any further because the rotor shafts would have to operate at higher speeds which would then produce the rotor dynamics problems discussed above. The limit of size for the Dev engine is reached.

It is an object of the present invention to provide for a rotor shaft that can operate at a higher rotational speed than the prior art rotor shafts without reaching the critical point for that shaft.

It is another object of the present invention to provide for a small twin spool gas turbine engine that can be scaled down to about 4 inches in diameter.

It is another object of the present invention to provide for a process for making a hollow rotor shaft that is capable of high speed rotation while not exceeding the critical speed for that shaft.

BRIEF SUMMARY OF THE INVENTION

A rotary shaft having an input end and an output end with a hollow shaft portion between the ends such that the natural frequency of the shaft is very high for the first bending mode of the shaft. The two ends are of solid construction and small diameter. The hollow shaft portion form a smaller hollow shaft joined with a larger hollow shaft between the ends. A transition from the ends to the hollow portions occurs smoothly with decreasing wall thickness. A cone shaped transition portion connects the smaller hollow shaft portion to the larger hollow shaft portion. The hollow rotary shaft is made from a material having a high elasticity to density ratio (such as 410 stainless steel) and low loss of elasticity at high temperatures. The low speed rotor shaft has a critical speed of above engine operating speed in order to eliminate the rotor dynamics issues.

A rotary shaft of the present invention is used as the inner or low speed rotor shaft in a small twin spool gas turbine engine that can be scaled down to about 4 inches in diameter and operate within the critical speed range of the engine.

BRIEF DESCRIPTION OF THE SEVERAL VIEWS OF THE DRAWINGS

FIGS. 4a and 4b shows a detailed view of a cross section of the turbine shaft bearings and the supports for the bearings.

DETAILED DESCRIPTION OF THE INVENTION

The present invention is a rotary shaft with a critical speed (third mode or bending mode) above the engine operating range such as 116,000 rpm for a 4 inch diameter fan engine. The rotary shaft of the present invention is intended to be used as the low speed rotor shaft in a small twin spool gas turbine engine with a thrust of less than about 500 pounds thrust. At this small size and high speed, the low speed rotor shaft must be completely redesigned from the prior art shafts in order to have an operating speed below the critical speed.

Figure 1:
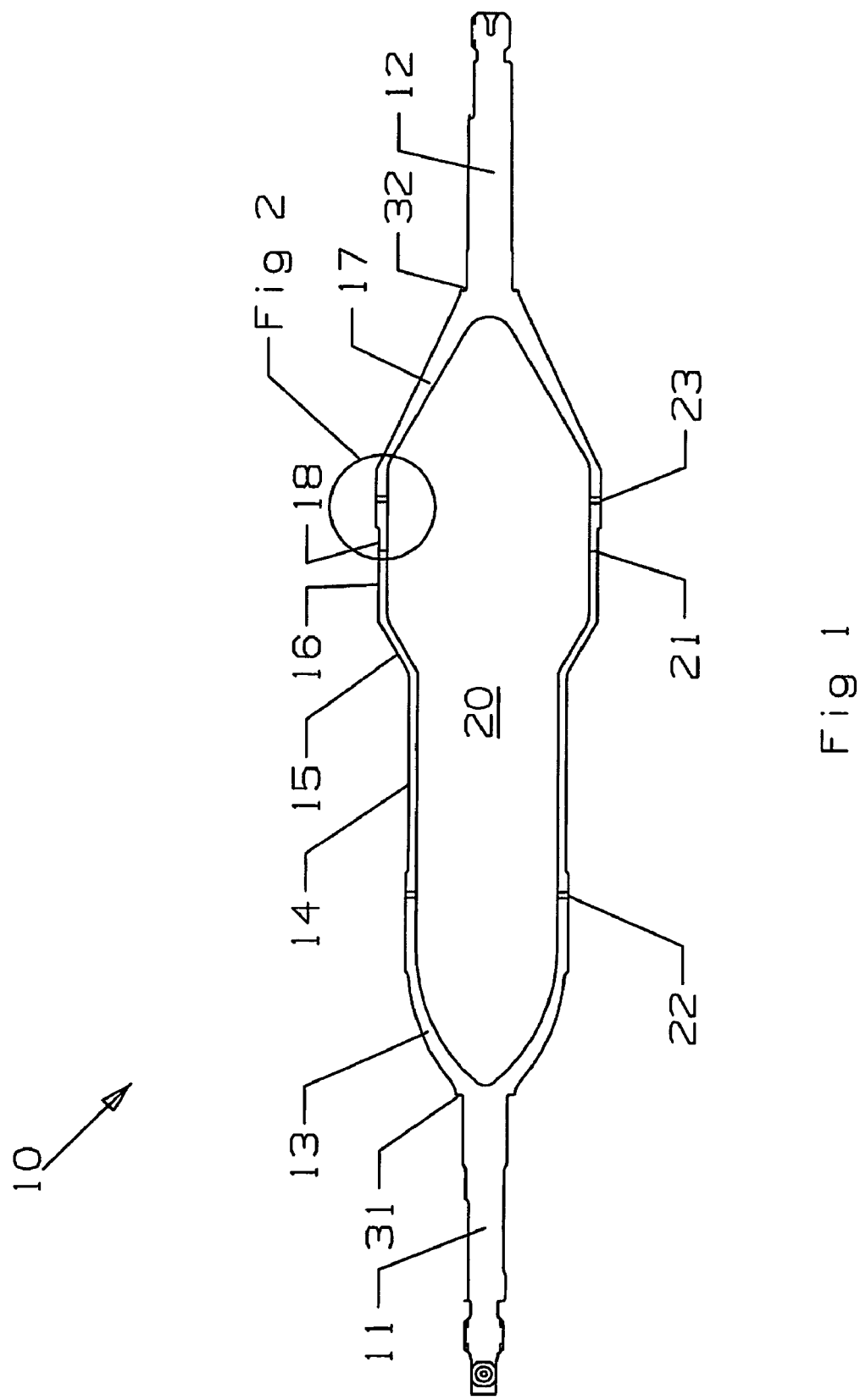
FIG. 1 shows a cross section view of the low speed rotor shaft of the present invention.

FIG. 1 shows a cross section view of the hollow rotary shaft of the present invention. The rotary shaft 10 includes a compressor shaft end 11 and a turbine shaft end 12 with a hollow middle portion forming a hollow interior 20 between the two end shafts 11 and 12. The hollow portion on the compressor shaft end 11 includes a compressor end or forward transition section 13, a small outer diameter section 14, a beveled section 15, and a larger outer diameter section 16. The hollow portion on the turbine shaft end 12 includes a turbine or aft end transition section 17 and an outer diameter section 18. The compressor end hollow section and the turbine end hollow section are both joined together at a weld line 21 that is described below.

The compressor shaft end 11 and the turbine shaft end 12 are solid shafts extending from the hollow portion of the inner rotor shaft. However, these solid sections 11 and 12 can also have a small diameter axial hole passing through to connect the outside of the shaft to the inside of the hollow portion. The small diameter holes could also pass partially into the shaft to provide, for example, a lubricant passage from a lubricant source outside of the shaft 10 to the bearings. The shaft ends 11 and 12 with the small diameter holes would be considered as substantially solid shaft ends or shaft portions of the inner rotor shaft 10. The small diameter holes passing through the solid shaft ends 11 and 12 can also be used to replace the radial holes 22 and 23 used during the welding process for attaching the two shaft sections together at the weld line 21.

The forward transition section 13 has a parabolic cross sectional shape as seen in FIG. 1 while the aft transition section 17 has a conical cross sectional shape. Each transition section 13 and 17 has a progressively narrowing thickness from the solid shaft end to the cylindrical hollow sections. In alternative embodiments, both transitions can be conical or parabolic, or the forward transition can be conical while the aft transition could be parabolic.

The solid shaft ends 11 and 12 each include a threaded end to receive a nut to secure the rotor disks and bearing assemblies to the twin spools of the engine. The solid shaft ends 11 and 12 also include slots inside of the threads in which a pin is inserted to rotatably secure the inner rotor shaft 10 to the fan rotor disk on the forward end or the low pressure turbine rotor disk on the aft end.

The shaft ends 11 and 12 also include axial abutments to retain an annular bearing housing against axial movement on the shaft 10. A forward axial abutment 31 is located on the forward end of the shaft at the transition between the solid shaft section 11 and the parabolic transition section 13. An aft axial abutment 32 is located on the aft end of the shaft at the transition between the solid shaft section 12 and the parabolic transition section 17. The two axial abutments 31 and 32 are used to produce a preload tensile force to the solid shaft ends when the twin spool rotor shaft assembly is assembled.

The length of the hollow portion of the rotary shaft between the end shafts is about 4 inches. The wall thickness of the larger outer diameter section 16 and the smaller outer diameter section 14 can be from about 0.030 inches to about 0.050 inches. In the preferred embodiment, the length is from about 0.038 inches to about 0.042 inches in range. The outer diameter section 18 of the turbine shaft end is also the same wall thickness. The outer diameter of the outer diameter section 18 is 1.094 inches to 1.098 inches, and the outer diameter of the smaller outer diameter section 14 is from 0.788 inches to 0.792 inches. The length of the compressor shaft end is 1.50 inches and the length of the turbine shaft end is 1.40 inches. The diameter of the compressor shaft end is 0.22 inches and the diameter of the turbine shaft end is 0.23 inches. The shaft ends are both solid shafts and have blades attached to them with supports for bearings. The rotary shaft of the present invention is made from 410 stainless steel (per AMS 5613) because this material has a very high Elasticity to density ratio and maintains the Elasticity with little change at high temperatures. This material required heat treatment cycles in order to achieve the required yield strength, ultimate tensile strength and Rockwell hardness. In order to provide the rotary shaft with a high critical speed above the operating speed, a material with a high Elasticity to density ratio is required.

Figure 3:
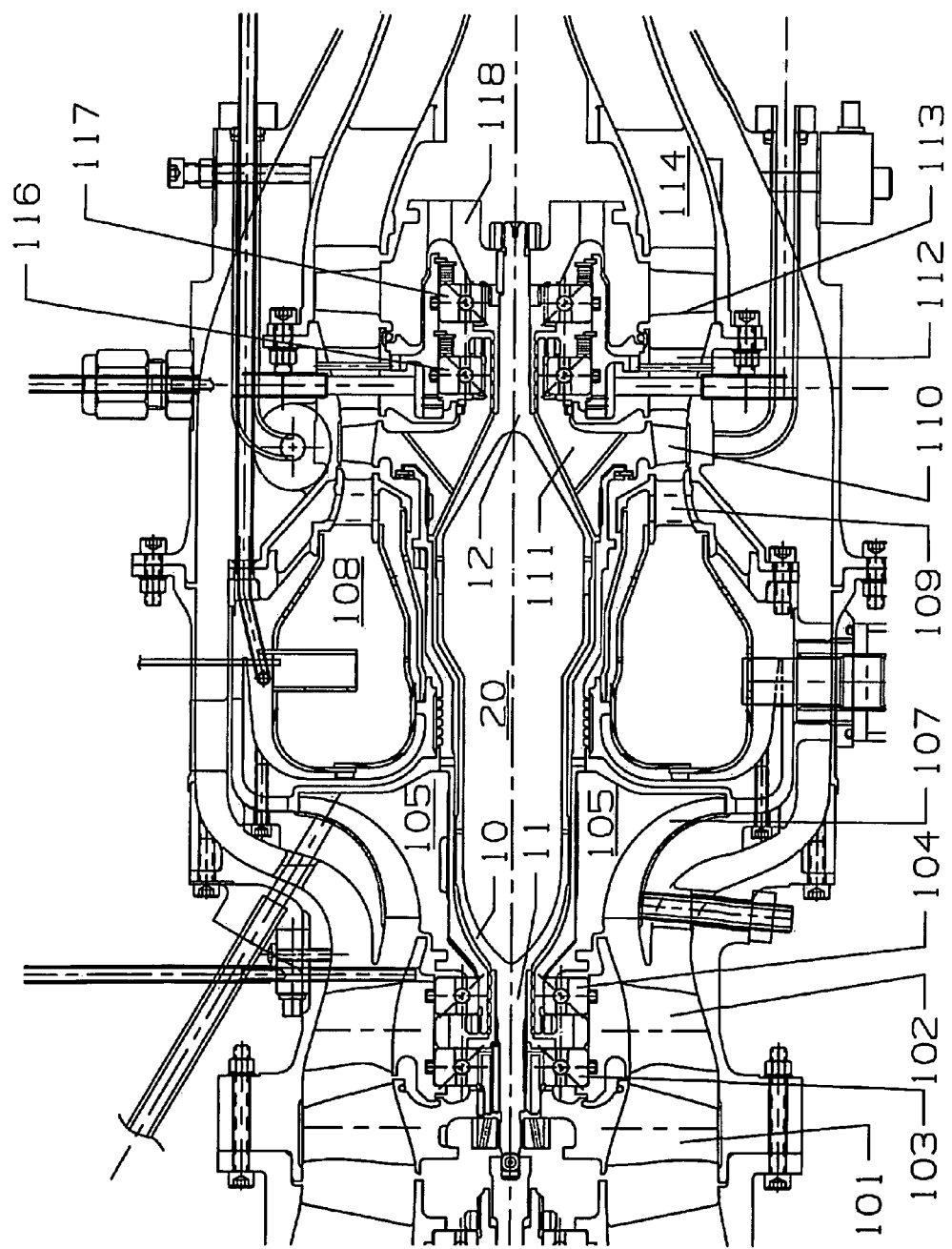
FIG. 3 shows a cross section view of a small gas turbine engine with the low speed rotor shaft of the present invention.

The compressor end transition piece 13 has a curved wall surface in order to accommodate the small space formed underneath the centrifugal compressor rotor disc in the gas turbine engine as shown in FIG. 3. The turbine end transition piece 17 is slanted in order to fit within the small space formed within the high pressure turbine blade rotor disc as seen in FIG. 3. Also, the smaller outer diameter section 14 has a diameter less than the outer diameter section 16 in order to accommodate the centrifugal compressor rotor disc as shown in FIG. 3. In order to shorten the distance between the two bearings that support the low speed rotor shaft 10, the low speed rotor shaft 10 had to fit within the spaces formed between the centrifugal compressor rotor disc 105 and the turbine blade rotor disc 111. Extending the distance between the low speed rotor shaft bearings would lower the critical speed below the operating speed of the shaft and therefore the design would not work.

The rotary shaft 10 of the present invention is designed to have as large of a diameter as possible with the thinnest walls as possible in order to produce a critical speed above an operating speed of 116,000 rpm. The low speed rotor shaft for use in the gas turbine engine of less than 300 pounds thrust must operate at 116,000 rpm in order to make this small twin spool gas turbine engine operational.

Figure 2:
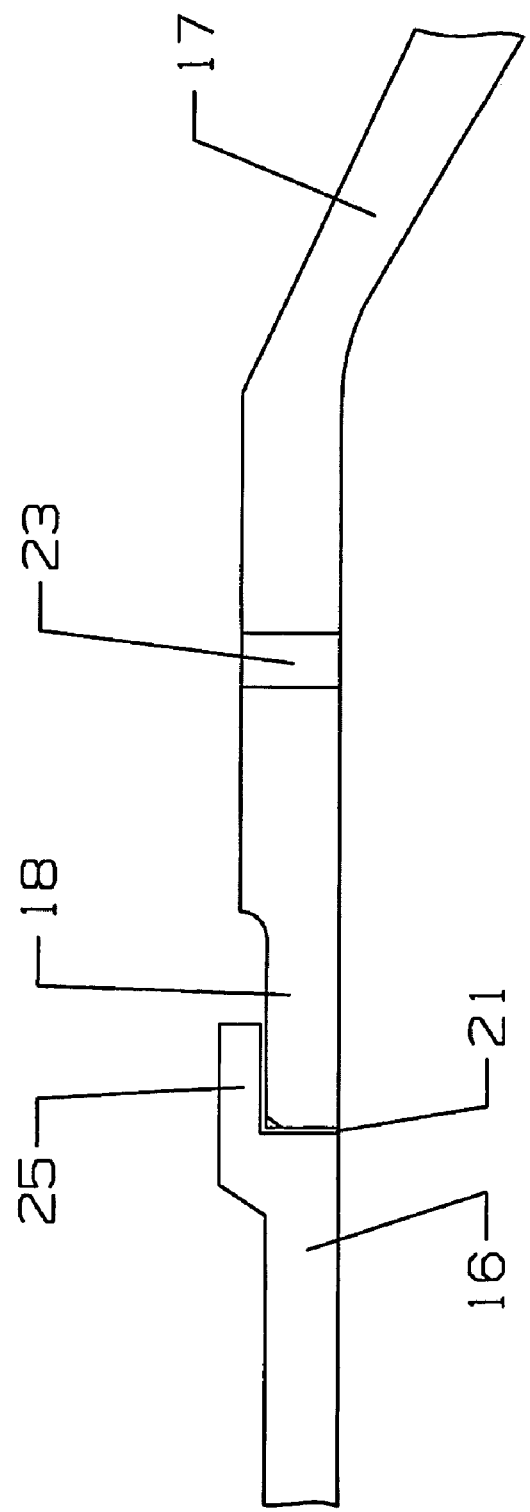
FIG. 2 shows a cross section view of the details of the welded joint between the two halves of the rotary shaft of FIG. 1.

Because the rotary shaft 10 is hollow, the shaft must be made from two parts that are welded together. In FIG. 1, the weld line is shown as 21 which is formed between the two ends of the outer diameter sections 16 and 18 in which both sections 16 and 18 have the same thickness and outer diameter. FIG. 1 shows a smooth transition between the two outer diameter sections 16 and 18 that is representative of the finished rotary shaft assembly 10. FIG. 2 shows a detailed view of the ends of the outer diameter sections before the weld is applied. The outer diameter section 16 of the compressor shaft end includes a lip section 25 that fits over the outer diameter section 18 of the turbine shaft end. However, the lip section 25 is not necessary. The lip 25 is a full annular lip that extends 360 degrees around the hollow section of the compressor shaft end and aids in the alignment of the two hollow sections before welding.

With the two hollow sections 14 and 16 assembled together and aligned, an orbital weld is used to weld the two hollow sections together. An orbital weld is used in order to minimize the addition of added mass to the welded area so that unbalancing of the shaft from the welding process is minimized. Other welding techniques can also be used such as EB weld, TIG, and MIG. Using other welding techniques that add mass to the weld could produce large unbalances that would have to be machined away or accommodated in other ways. The orbital weld is a weld per AWS D17.1 and the part is preheated to 300 degrees F. prior to welding. The welding process should utilize the parent material for filler with 100% penetration required. Weld filler material can be AMS 5776 stainless steel grade 410.

After welding, a straightening process is performed. Then vacuum heat treatment at 1700 degrees F. (+/−25 degrees F.) for 30 minutes with an argon fan to cool the part is performed. Then, vacuum heat treatment twice at 600 degrees F. (+/−25 degrees F.) for 2 hours with argon fan cooling is performed. This process gives the metal material the properties similar to AMS 5609A which is required for the shaft to have a critical speed above the operating speed for the scaled down engine. A full penetration of the weld is desirable.

To provide for extra balancing of the welded hollow rotary shaft after the welding process has joined to the hollow sections together, material is removed from both hollow shaft sections around the area on which the two small diameter holes 22 and 23 appear. As seen in FIG. 1, the outer diameter of the hollow shaft sections in which the holes 22 and 23 appear have a slightly larger outer diameter than the adjacent hollow shaft sections 14 and 18. The width of the holes section 22 is about 0.5 inches with an extra thickness of 0.026 inches. The extra thickness of the hole section 23 is around 0.031 inches with a width slightly less than 0.5 inches. When the two hollow shaft sections are welded together material can be removed from one or both of these hole sections 22 and 23 in order to balance the rotary shaft. Other balance location could be used.

The holes 22 and 23 form the function of allowing gas to escape from the hollow interior space 20 during the orbital welding process so that a pressure differential formed on the hollow walls do not bend out and damage or prevent the weld from forming properly. The small diameter holes 22 and 23 equalize the pressures between the hollow interior 20 and the exterior of the shaft during the welding process. The hole diameter for both is from 0.058 inches to 0.068 inches in diameter. The holes can also be used to flow argon across the inside portion of the weld, usually in a vacuum. This will prevent the build up of weld material on the inside of the rotor shaft at the joint. Allowing for too much material to build up inside the rotor shaft assembly after being joined together could cause imbalance problems since the inside portions of the rotor shaft cannot be accessed once the two shaft portions have been joined together.

In the twin spool gas turbine engine of the present invention described above, the diameter of the fan is about 4 inches. The engine can be scaled up to as large as about 18 inches in diameter of the fan and still suffer from the same problems for which the present invention solves for. When the engine is scaled up to, for example, 12 inches in diameter of the fan, the rest of the engine is also scaled up and the distance between the bearings increases. In this scaled up version, the rotational speeds of the inner and the outer rotor shafts will be lower. However, since the shafts will be larger and the spacing between the bearings that support the rotor shafts will also increase, the same problems concerning the rotor dynamics will also occur in the scaled up rotor shafts. Thus, even when the smaller engine of about 4 inches in diameter is scaled up to about 16 inches, even though the rotational speeds for the shafts will be lower, the rotor dynamic problems of the 4 inch engine will also occur in the scaled up shafts. The larger sized rotor shafts—even though they operate at lower rotational speeds than in the 4 inch diameter engine—the critical speed for the larger rotor shafts will decrease. Thus, the same design solutions would be required for the scaled up engine in order to make possible the twin spool gas turbine engine of this size. Thus, the rotor shaft design of the present invention for the 4 inch diameter engine can be used for larger engines as well.

The present invention is described for a small twin spool gas turbine engine with a fan diameter of about 4 inches. However, the low speed rotor shaft of the 4 inch engine can be scaled up for use in a twin spool gas turbine engine of about 18 inches. Although the rotor shaft of the 18 inch engine would operate at a much lower rotational speed, the rotor dynamics problem would occur at a lower speed because the diameter of the shaft and the length between the bearing supports would also increase. For example, when the distance between the shaft support bearings is increased, the critical speed of the shaft is lowered.

The inner rotor shaft 10 of the present invention is shown to have the smaller diameter hollow section 14 and the larger diameter hollow section 16 for the main purpose of fitting the shaft within the small space formed inside of the compressor rotor disk 105 and the annular combustor assembly 108. The wider open space within the annular combustor assembly 108 allows for the larger diameter hollow section 16. The inner rotor shaft of the present invention could be made such that both compressor end and turbine end of the hollow section of the shaft could have the about the same diameter.

The hollow inner rotor shaft of the present invention can also be made from a super plastic forming process or a hydra forming process in which a blank is inserted into a die and high pressure is used to form the hollow shaft but as a single piece instead of the two piece hollow shaft of the first embodiment. For a hollow rotor shaft made from titanium, use of the super plastic forming process would use a tube stock of material placed within a die having the outer shape of the desired shaft. A high pressure gas (super plastic forming process) or a high pressure liquid (hydra forming process) is delivered to the inside surface of the tube stock to force the tube stock into the shape of the die representing the hollow rotor shaft. The super plastic and hydra forming processes have several benefits over the two piece welded shaft of the first embodiment such as no seems are left, the process requires no welds, and the shaft is made of one piece. In the process, small diameter holes would be formed in one or both of the solid shaft ends to inject the high pressure fluid used to form the shaft in the die.

The hollow rotor shaft 10 is used in a small twin spool gas turbine engine shown in FIG. 3. A fan 101 is rotatably secured to the forward end of the inner rotor shaft 10. A inlet guide vane assembly 102 is located immediately downstream from the fan 101 and includes an inner shroud that forms a bearing support surface for the forward bearings that support the two rotor shafts. An inner bearing sleeve is placed over the solid shaft end of the inner rotor shaft that supports the inner race of the inner shaft 10. a low pressure turbine rotor disk 113 is connected to the inner rotor shaft on the aft end. Threaded nuts are used on both ends of the inner rotor shaft 10 to secure all the parts together.

An outer rotor shaft extends around the inner rotor shaft on the forward end and is supported by the forward outer shaft bearing 104. A centrifugal compressor 105 is secured on the forward end of the outer rotor shaft while a high pressure turbine disk 111 is supported on the aft end by a snap ring that fits within annular grooves formed on the outer shaft end and the turbine rotor disk 111. Aft bearings 116 and 117 extend from a support surface on the second stage turbine guide vane. An inner bearing housing is also located on the aft end of the inner rotor shaft on which the aft inner bearing 117 is supported. An axial extension of the turbine rotor disk 111 is positioned between the inner bearing housing and the high speed bearing 116 to support the bearing 116. An annular combustor 108 is positioned between the compressor 105 and the first stage guide vane assembly 109.

We claim the following:

1. A small twin spool gas turbine engine comprising:
an inner rotor shaft with a fan and a low pressure turbine rotor disk connected to rotate with the shaft;
an outer rotor shaft with a high pressure compressor and a high pressure turbine rotor disk connected to rotate with the shaft;
the inner rotor shaft being capable of rotating within the outer rotor shaft;
the inner rotor shaft having a hollow middle portion and substantially solid shaft ends extending from the hollow middle portion; and,
the fan and the low pressure turbine rotor disk are secured onto the substantially solid shaft ends.

2. The small twin spool gas turbine engine of claim 1, and further comprising:
the hollow middle portion further comprising a smaller diameter section on a compressor end and a larger diameter section on a turbine end; and,
a smaller conical shaped transition section joining the smaller diameter section to the larger diameter section.

3. The inner rotor shaft of claim 2, and further comprising:
a parabolic shaped transition section between the shaft end and the hollow middle portion on the compressor end, and a larger conical shaped transition section between the shaft end and the hollow middle portion on the turbine end.

4. The small twin spool gas turbine engine of claim 3, and further comprising:
the larger conical shaped transition section includes a progressively decreasing wall thickness in the direction away from the solid shaft end.

5. The small twin spool gas turbine engine of claim 1, and further comprising:
the inner rotor shaft is made substantially of 410 stainless steel.

6. The small twin spool gas turbine engine of claim 1, and further comprising:
the hollow rotor shaft is formed from at least two sections welded together in the hollow middle portion.

7. The small twin spool gas turbine engine of claim 1, and further comprising:
the hollow middle portion of the shaft having a hole to equalize pressure between the hollow shaft and an ambient pressure outside the hollow shaft.

8. The small twin spool gas turbine engine of claim 1, and further comprising:
the fan has a diameter of less than 18 inches.

9. The small twin spool gas turbine engine of claim 1, and further comprising:
the fan has a diameter of around 4 inches.

10. The small twin spool gas turbine engine of claim 7, and further comprising:
the hole diameter is from around 0.058 inches to around 0.068 inches.

11. The small twin spool gas turbine engine of claim 7, and further comprising:
the hollow shaft portion includes a plurality of small holes in the smaller diameter section and extending around the hollow shaft; and,
a plurality of small holes in the larger diameter section and extending around the hollow shaft.

12. The small twin spool gas turbine engine of claim 1, and further comprising:
an axial length of the hollow middle portion of the inner rotor shaft is around 4 inches.

13. The small twin spool gas turbine engine of claim 2, and further comprising:
the smaller diameter section of the hollow middle portion of the inner rotor shaft has a diameter of around 0.8 inches; and,
the larger diameter section of the hollow middle portion of the inner rotor shaft has a diameter of around 1.1 inches.

14. The small twin spool gas turbine engine of claim 2, and further comprising:
the solid shaft end on the compressor side of the inner rotor shaft has an axial length of around 1.5 inches; and,
the solid shaft end on the turbine side of the inner rotor shaft has an axial length of around 1.4 inches.

15. The small twin spool gas turbine engine of claim 1, and further comprising:
the inner rotor shaft has an axial length of around 7 inches.

\* \* \* \* \*